Oct. 9, 1934.   R. J. AUNE   1,976,276
WINDSHIELD HEATER
Original Filed March 19, 1931
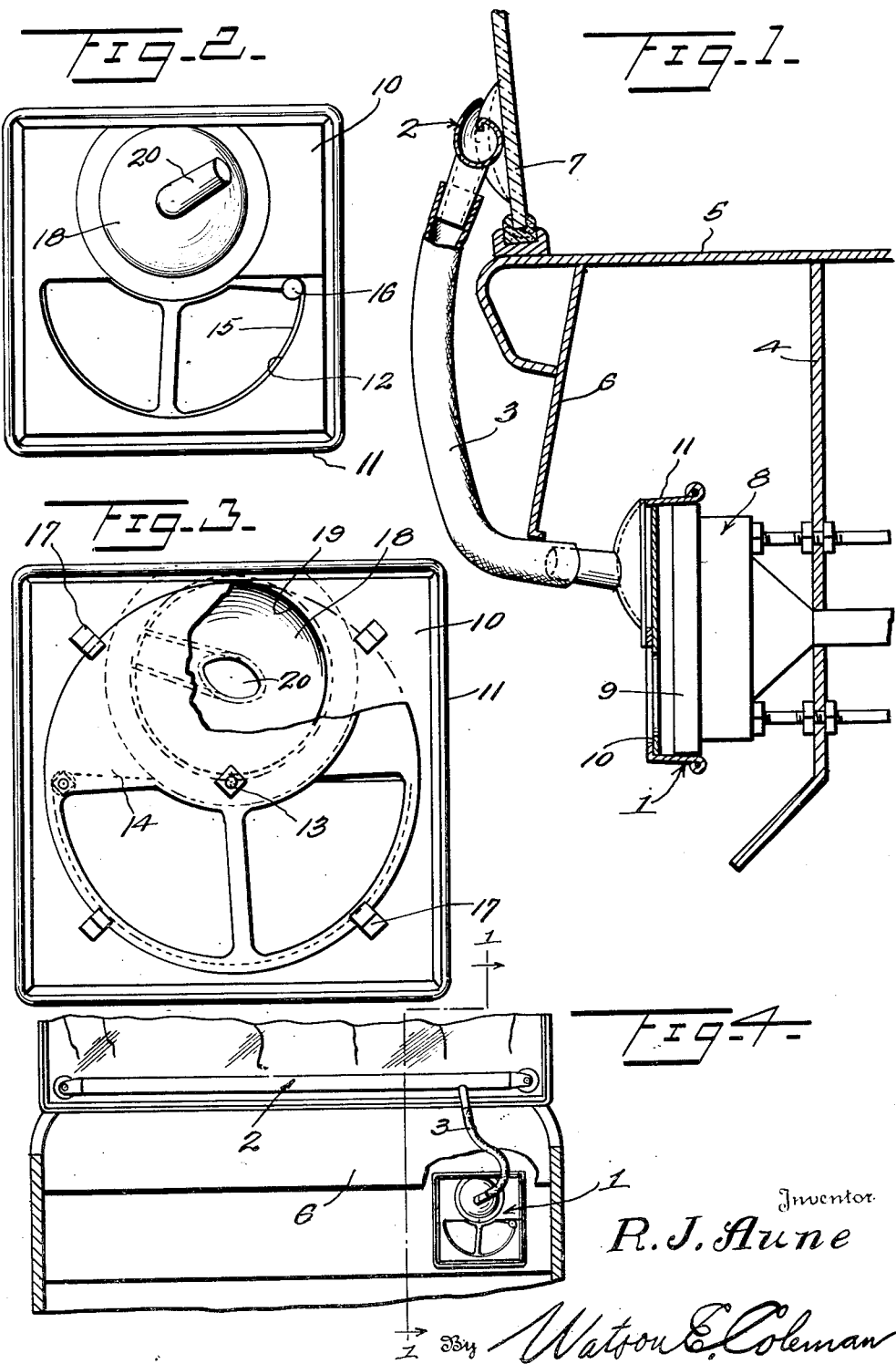
Inventor
R. J. Aune
By Watson E. Coleman
Attorney Patented Oct. 9, 1934

1,976,276

UNITED STATES PATENT OFFICE 1,976,276

WINDSHIELD HEATER

Richard J. Aune, Fergus Falls, Minn.

Original application March 19, 1931, Serial No. 523,872. Divided and this application July 27, 1933, Serial No. 682,392

4 Claims. (Cl. 98—2)

This invention relates to improvements in motor vehicle and windshield warming devices and constitutes a division of my pending application, Serial No. 523,872, filed March 19th, 1931.

The primary object of the present device is to provide an improved means for controlling the distribution of air which has been heated for introduction into a motor vehicle by a warm air heating unit of standard make, the device being designed particularly for application to types of commercial heaters of which those known as the "Ha-Dees" or the "Tropic Air" are examples.

The heaters of the type referred to are usually mounted within the motor vehicle upon the dashboard behind the instrument board and the heated air generated thereby is discharged directly into the motor vehicle. The device embodying the present invention comprises a unit adapted to position over the air discharge opening of the heater and having two outlets which are controlled by a suitable valve, one of which outlets opens directly into the vehicle, while the other is designed to have a warm air conducting tube connected therewith for conveying the warmed air to a distributing head or nozzle mounted upon or adjacent the inner surface of the vehicle windshield so that the formation of ice or frost upon the outside of the windshield will be prevented due to the warmed condition of the windshield glass.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a sectional view on an enlarged scale taken on the line 1—1 of Figure 4 and illustrates the application of the device embodying the present invention, together with the warm air distributing nozzle which forms the subject-matter of the parent application;

Figure 2 is a view in front elevation of the warm air collector unit, per se;

Figure 3 is a rear elevation of the warm air collecting unit, per se, a portion thereof being broken away;

Figure 4 is a view showing the portion of a motor vehicle looking toward the instrument board of the same and illustrating the application of the device.

Referring now more particularly to the drawing wherein like numerals of reference indicate corresponding parts throughout the several views, the numeral 1 indicates generally the device embodying the present invention, with which are connected the warm air distributing nozzle 2 which forms the subject-matter of the parent application, as previously stated, and the connecting pipe 3 which conveys the warmed air from the collector unit 1 to the nozzle 2.

Only those portions of the motor vehicle body with which the present device and the distributing nozzle are connected, are illustrated and these constitute the dashboard 4, the rear portion of the hood 5, the instrument dash 6, and the windshield 7.

The numeral 8 indicates generally a warm air heater of the type previously referred to, which is mounted upon the dash 4 within the vehicle and which has a head 9, the face of which is open to permit the heated air to escape into the vehicle. The warm air distribution controlling unit 1 is designed for engagement over the head 9 to cover the warm air outlet thereof and as shown this device comprises a plate 10 about the edges of which an integral flange 11 is formed, within the confines of which the head 9 of the air heater is frictionally or otherwise suitably secured.

The plate 10 has formed therein the opening 12 which is preferably substantially semi-circular and at the radial center of this opening there is mounted a pivot bolt 13.

Adjacent the inner face of the plate 10 there is mounted upon the bolt 13, the disk 14 and this disk is provided with the two quarter circular openings 15 which together are of substantially the same size and contour as the opening 12. A knob 16 carried by the disk and extending through the opening 12, facilitates the turning of the disk upon the bolt 13 so as to close, open or partly open the opening 12.

In order to retain the edge of the disk 14 in the desired proximity to the inner face of the plate 10, the said plate is provided with the guide lugs or fingers 17 which engage over the edge of the disk in the manner illustrated.

At the side of the opening 12, the plate 10 is provided with the hood 18 which overlies the opening 19 in the plate and this hood has connected therewith and extending therefrom away from the plate 10, the nipple 20 with which one end of the air conducting hose or tube 3 is connected. While the drawing illustrates the device as having the plate 10 provided with a cutout 19 over which the hood 18 positions, it is to be understood that the hood may be pressed outwardly from the plate so as to form an integral part thereof.

The device 1 is applied to the heater 8 in the manner illustrated in Figure 1 so that the flanges 11 will engage around the head 9 of the heater and the inner surface of the plate 10 will be brought into close proximity to the warm air outlet face of the heater. It will be readily apparent from the description that by turning the disk 14 which operates in the nature of a valve, the entire opening 12 may be uncovered so that all of the air from the heater 8 will be discharged directly into the vehicle, at which time the outlet leading to the nipple 20 will be covered. By giving the disk 14 a quarter revolution from either the opened or closed position, one half of the opening 15 may be brought into position before the inner side of the hood 18 so that some of the warm air will escape through the nipple 20 and be conducted to the windshield. The other half of the opening 15 will permit the air to pass from the heater 8 into the vehicle. By turning the disk 14 half a revolution from its opened position, the outlet 12 can be completely closed so that only the hood 18 will receive warm air from the heater.

From the foregoing it will be readily apparent that with a device embodying the present invention, means is had whereby some of the air from the heater may be readily conducted to a suitable distributing head or nozzle mounted upon the windshield so that the latter may be kept in a warmed condition during freezing weather and the formation of ice upon the windshield prevented.

Having thus described the invention, what is claimed is:—

1. In an attachment for an automobile having an air heater therein, a shield member designed to be secured to said heater and to obstruct the discharge of warm air therefrom, said shield having a pair of openings therein, a nozzle carried by the shield and overlying an opening for the connection of a tube to the shield for the conduction of warm air to a point of distribution, and a disk member rotatably mounted on the shield and having an opening, said disk overlying the shield openings and the end of the nozzle opening therethrough, and facilitating the selective discharging of warm air through the shield openings.

2. In an attachment for an automobile having an air warming device therein, a shield member comprising a flat plate having an angularly directed surrounding flange, said flange being designed to receive and frictionally engage the air warming device to maintain said shield in position over a face thereof from which warm air is discharged, said shield having a pair of openings therethrough, a hood overlying one of said openings, a nozzle extending from said hood and adapted to have an air hose connected therewith to facilitate the conduction of warm air to a point remote from the shield, a disk rotatably mounted against the inner face of the shield to overlie said openings, said disk having an opening therein designed to be selectively registered with the openings of the shield, and means for facilitating the rotation of the disk from the front of the shield.

3. In an attachment for an automobile having an air warming device therein, a shield member comprising a flat plate having an angularly directed surrounding flange, said flange being designed to receive and frictionally engage the air warming device to maintain said shield in position over a face thereof from which warm air is discharged, said shield having a pair of openings therethrough, a hood overlying one of said openings, a nozzle extending from said hood and adapted to have an air hose connected therewith to facilitate the conduction of warm air to a point remote from the shield, a disk disposed against the inner face of said shield, pivot means securing the radial center of the disk to said shield, means carried by the shield and engaging the edge of the disk to retain the same in position, said disk overlying the openings through the shield and having an opening designed to be brought into registry with either of the shield openings, and means carried by the disk and extending through and movable in one of the shield openings to facilitate rotation of the disk.

4. An attachment for an automobile air warming device of the type having a casing disposed within the automobile and having a warm air discharge face, comprising a flat body designed to overlie said face, a flange carried by and surrounding said flat body and adapted to receive the casing to retain the flat body in position thereover, said flat body being formed for the passage of air therethrough, means carried by the flat body for facilitating the attachment of a warm air conducting pipe thereto for the reception of a portion of the warmed air passed therethrough, a portion of the warmed air passed by the flat body entering directly into the automobile, and a valve disk pivotally secured to the flat body to rotate in a plane paralleling the plane of the body and having an aperture whereby the passage of warm air through the body directly into the automobile or to said pipe may be selectively controlled.

RICHARD J. AUNE.